July 16, 1968   F. SEIBERT ETAL   3,392,428
APPARATUS FOR PRODUCING EXTRUDED BODIES FROM A PLASTIC MASS
Filed Feb. 9, 1966   3 Sheets-Sheet 3

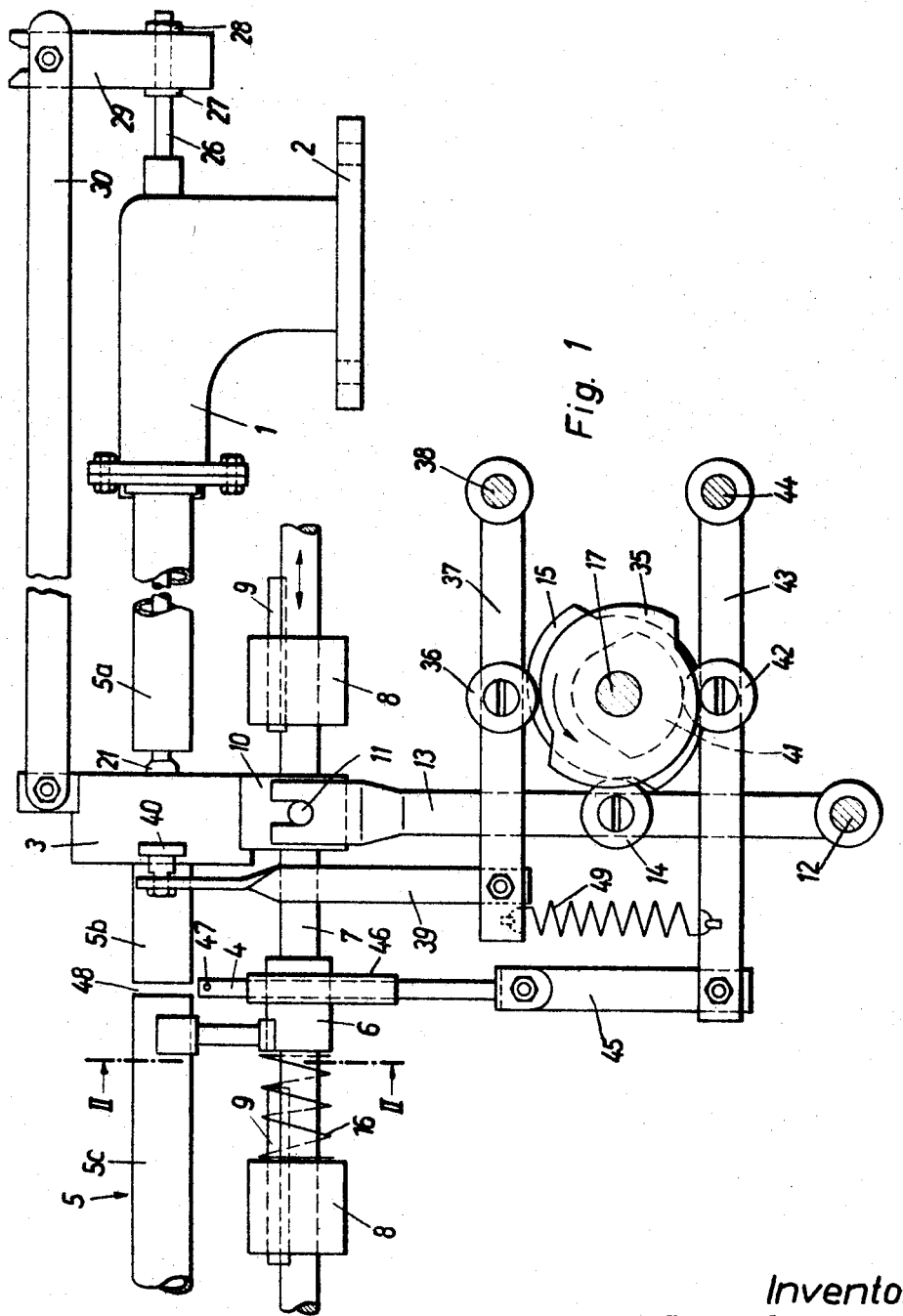

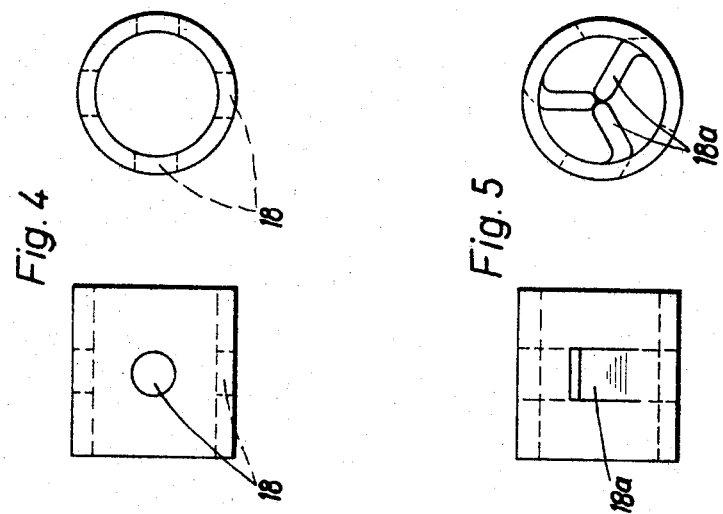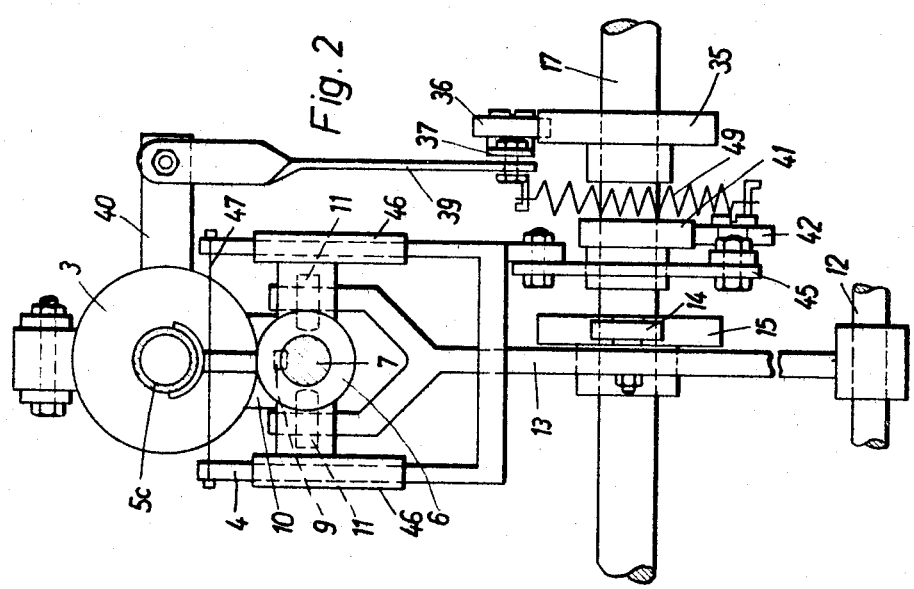

Inventors
Felix Seibert
Paul Seibert
By Young & Thompson
Attys.

United States Patent Office 3,392,428
Patented July 16, 1968

3,392,428
APPARATUS FOR PRODUCING EXTRUDED BODIES FROM A PLASTIC MASS
Felix Seibert and Paul Seibert, both of Bergstrasse 16, Baumbach, Westerwald, Germany
Filed Feb. 9, 1966, Ser. No. 526,127
6 Claims. (Cl. 25—11)

ABSTRACT OF THE DISCLOSURE

Ceramic heat exchange rings are extruded, formed by radially movable penetrating members, and then cut to length. The forming members act against a mandrel disposed within the extruded material, and the forming and cut-off members and the mandrel all reciprocate together as a unit.

---

The present invention relates to apparatus for producing extruded bodies from a plastic mass such as clay or the like, and particularly to such apparatus by which lateral penetration of the extruded body may also be effected, that is, penetration in a direction transverse to the direction of extrusion.

In the past, in order to produce extruded bodies having lateral penetration, such as holes or inwardly protruding tongues, it has been necessary to extrude a continuous length of material and to cut it to the desired length. The pieces have then been predried, separated, immersed in a thin mold oil, and individually worked with a perforating or cutting tool in order to produce the lateral penetration. Obviously, this procedure is time consuming and expensive.

Accordingly, it is an object of the present invention to provide apparatus for the manufacture of extruded bodies from a plastic mass, in which the various work operations can be performed on the extruded material during extrusion and before the length of extruded material is cut up.

Another object of the present invention is the provision of such apparatus that has unique provision for oiling the extruded material prior to subsequent working.

Still another object of the present invention is the provision of such apparatus which operates continuously and automatically.

Finally, it is an object of the present invention to provide such apparatus that will be relatively simple and inexpensive to manufacture, easy to operate, maintain and repair, and rugged and durable in use.

Other objects and advantages of the present invention will become apparent from a consideration of the following description, taken in connection with the accompanying drawings, in which:

FIG. 1 is a side elevational view of apparatus according to the present invention, without the supporting machine frame;

FIG. 2 is a cross-sectional view taken on the line II—II of FIG. 1;

FIGS. 4 and 5 are each a side elevational view and an end elevational view of an embodiment of hollow body that can be produced by the present invention, FIGS. 4 and 5 representing different embodiments of hollow body.

Figure 3:
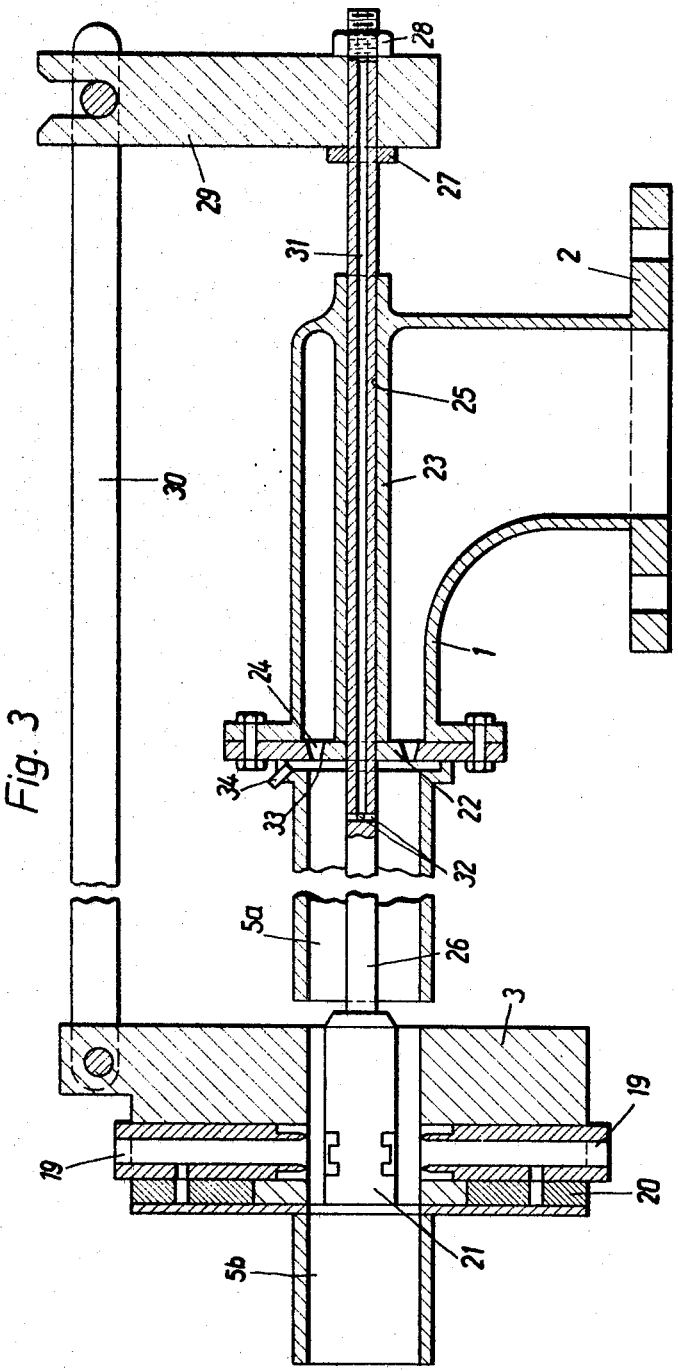
FIG. 3 is a longitudinal sectional view through a portion of the apparatus shown in FIG. 1.

Refering now to the drawings in greater detail, there is shown an angled extrusion head 1 adapted to be mounted by means of a flange 2 on a piston or screw molding device (not shown) by which a plastic mass such as clay is forced into head 1. Head 1 defines within itself an extrusion chamber from which the plastic material is extruded to the left as seen in FIGS. 1 and 3.

The plastic material leaving the extrusion chamber passes through guide means, which include a forming device 3. A serving device or cutter 4 is carried by the guide means and particularly by device 3 and serves predetermined lengths of the extruded material that has passed through forming device 3. The guide means also includes a guideway indicated generally at 5. A sleeve 5a is fixedly mounted on head 1 with its axis parallel to the direction of extrusion. A first portion 5b of the guide means is mounted on and for movement with formin device 3, and a second portion 5c of the guide means is mounted on a support 6 with which the cutter 4 is also slidably connected.

The forming device 3 and the cutter 4 are interconnected by and movable with a common guide rod 7 which is mounted for reciprocation parallel to its length and parallel to the extrusion direction in bearings 8 fixedly secured to the machine frame (not shown). Guide rod 7 is slidably keyed to the bearings 8 by a key 9 to prevent relative rotation of rod 7 and bearings 8.

A support 10 is carried by the guide rod 7 and in turn carries forming device 3. Support 10 has two laterally outwardly projecting pins 11 which are carried in the bifurcated ends of the yoke of a control lever 13 which at its other end is pivotally mounted on a trunnion 12 that is stationary with the machine frame. Control lever 13 has a cam follower roller 14 that rides on a cam surface of a cam disc 15. A coil compression spring 16 acts between bearing 8 and support 6 continuously to urge rod 7 to the right as seen in FIG. 1, and this in turn maintains contact between roller 14 and cam disc 15.

Cam disc 15 is fixedly secured to a shaft 17 which is driven by an infinitely variable gear system (not shown) in the direction of the arrow in FIG. 1 at a speed such that guide rod 7, and therefore also the forming device 3 and the cutter 4, move parallel to and in the same direction as the extruded material and with the same velocity as the extruded material, for a horizontal distance corresponding to the length of the individual hollow body to be manufactured, before returning in a direction to the right in FIGS. 1 and 3.

During this forward movement, the forming device 3 and the cutter 4 are actuated. Forming device 3 is characterized by radially reciprocal members that produce the perforations 18 of the hollow body shown in FIG. 4, or the inwardly displaced portions 18a shown in the embodiment of FIG. 5. It will be understood that the hollow bodies of FIGS. 4 and 5 may for example be used as regenerative heat-exchange members; and when so used, a large number of such hollow bodies will be arranged at random within a regenerative heat-exchange chamber.

For forming the perforations 18, for example, the forming device 3 has radially reciprocable hollow punches 19 that are secured to pins that travel in spiral recesses in a disc 20 that is rotatable about its axis.

A mandrel 21 is concentrically disposed within the guide means and reciprocates toward and away from a nozzle 22 that closes the extrusion chamber. The nozzle 22 is carried by the forward end of a hollow sleeve 23 and defines an annular recess 24 through which the plastic mass is extruded into the shape of a hollow sleeve.

Sleeve 23 has a longitudinal bore 25 extending all the way therethrough and therefore all the way through the extrusion chamber. A shaft 26 is slidably reciprocably disposed in bore 25 and is thus shielded by sleeve 23 from exposure to the material in the extrusion chamber. At its forward end, shaft 26 carries mandrel 21. Mandrel 21 can have a plain cylindrical outer surface; or, if inwardly directed projections such as 18a are to be formed in the extruded material, then the surface of mandrel 21 can be correspondingly recessed.

At its end opposite mandrel 21, shaft 26 carries an annular flange 27 and a screw-threadedly received nut 28 between which is secured an upstanding arm 29. Arm 29 in turn is detachably connected by a pin and clevis joint to a connecting rod 30 which is pivotally interconnected at its forward end to forming device 3. Thus, the guide means and the forming device 3 and the mandrel 21 and the cutter 4 and the shaft 26 are all interconnected for reciprocatory movement as a group relative to the extrusion chamber and the extrusion nozzle, in a direction parallel to the direction of extrusion.

Shaft 26 has a longitudinally extending channel 31 therethrough that terminates at its forward end in radially outwardly extending bores 32 that are spaced from nozzle 22 in the direction of extrusion and are thus disposed between nozzle 22 and mandrel 21. Means (not shown) are provided for supplying oil under pressure to the right-hand end of channel 31 as seen in FIG. 3, so that oil is sprayed from bores 32 into the interior of the newly extruded material. For oiling the outer surface of the extruded tube, an inwardly opening annular groove 33 is provided at the joint between sleeve 5a and the adjacent end of the extrusion head, which groove is supplied with oil by means of a connection 34. Means (not shown) are provided for supplying oil under pressure to connection 34.

The operation of the forming device 3, that is, the rotation of disc 20 and the resulting reciprocation of punches 19, is effected by means of cam disc 35 fixed to the shaft 17. A cam follower roller 36 contacts the cam surface of disc 35 and is in turn carried by a lever 37 rotatably mounted at one end about a trunnion 38 stationary with the machine frame. At its other end, lever 37 is connected by means of a connecting tongue 39 with an arm 40 that projects radially outwardly from control disc 20.

Cutter 4 is actuated by means of a cam disc 41 fixed to shaft 17. The cam surface of cam disc 41 bears against a cam follower roller 42 rotatably mounted on a lever 43 that pivots about a trunnion 44 fixed to the machine frame. At its other end, lever 43 is secured to a tongue 45 which in turn is pivotally interconnected with the cutter 4. Cutter 4, in turn, is in the form of a U-shaped bracket whose two legs reciprocable in guide sleeves 46 carried by support 6. A cutting wire 47 is stretched between the upper ends of the legs, and this wire passes through a narrow slot or gap 48 between first and second portions 5b and 5c to sever the hollow bodies from the tubular sleeve of extruded material. A coil tension spring 49 maintains cam follower rollers 36 and 42 in continuous contact with their associated cam discs profiles.

The arrangement of the cam discs is such that, while the forming device 3 provides perforations 18 or projections 18a in the tube of extruded material, the cutting wire 47 severs a previously finished hollow body from the extruded tube. But as the entire cutter 4 moves along with the extruded tube at the same velocity, a straight or right-angled cut is thus ensured. Preferably, cam disc 41 is so formed and spaced that cutter 4 executes a cut while moving in one direction and a second cut while moving in the opposite direction. Naturally, forming device 3 and cutter 4 operate on the extruded material only during movement of rod 7 to the left as seen in FIG. 1. The finished and formed individual hollow bodies then leave the guide means through the second section 5c.

In order to remove the extrusion head for supplying additional material to be extruded or for the other purposes, the connecting rod 30 can be raised from contact with arm 29, and shaft 26 can be drawn to the right as seen in FIG. 3 until mandrel 21 is within sleeve 5a, after which the extrusion head 1 can be lifted away from its associated mold cylinder (not shown).

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

Having described our invention, we claim:

1. Apparatus for the manufacture of extruded bodies from a plastic mass, comprising means defining an extrusion chamber, an extrusion nozzle for the discharge of extruded material from the chamber, a forming device through which the extruded material passes, said forming device including forming members movable transversely to the path of movement of the extruded material between outer positions in which the members are disposed outside the material and inner poistions in which the members penetrate the material, a mandrel disposed within the forming device in the path of said forming members and defining with the forming device a passagaway for the movement of extruded material between the mandrel and the forming device, a shaft carrying the mandrel and extending through the chamber parallel to the direction in which the material is extruded from the nozzle, and means interconnecting said forming device and mandrel and shaft for reciprocating movement as a group relative to said chamber and nozzle in a direction parallel to said shaft both in said outer and in said inner positions of said forming members.

2. Apparatus as claimed in claim 1, and a hollow sleeve extending through the chamber, the shaft being slidable lengthwise in said sleeve, said sleeve sealing the shaft from contact with material in the chamber.

3. Apparatus as claimed in claim 1, said interconnecting means interconnecting said forming device and said shaft on the side of said chamber which is opposite said mandrel.

4. Apparatus as clamed in claim 3, and a detachable connection between said forming device and said shaft so that when said connection is detached, said shaft may be withdrawn through said chamber until said mandrel is withdrawn from within said forming device.

5. Apparatus as claimed in claim 1, and a cutter for cuting off lengths of material that have left the mandrel, said cutter being interconnected for reciprocating movement with said forming device and mandrel and shaft.

6. Apparatus as claimed in claim 5, and a rotatable camshaft having three cams thereon, one of said cams reciprocating said interconnected forming device and mandrel and shaft and cutter as a group, the second of said cams moving said forming members between said outer and inner poistions, and the third of said cams moving said cutter transverse to the path of movement of said extruded material.

References Cited

UNITED STATES PATENTS

| | | | |
|---|---|---|---|
| 1,811,412 | 6/1931 | Whitacre | 25—107 |
| 2,075,038 | 3/1937 | Hutchinson | 25—17 XR |
| 2,644,983 | 7/1953 | Curtiss | 25—18 XR |
| 2,724,216 | 11/1955 | Cisne. | |
| 2,834,983 | 5/1958 | Norton | 25—11 XR |
| 3,039,138 | 6/1962 | Hall et al. | 25—107 XR |
| 3,176,494 | 4/1965 | Cullen et al. | 25—17 XR |
| 3,183,571 | 5/1965 | Schmunk et al. | 25—107 XR |
| 3,303,251 | 2/1967 | Heider et al. | 18—14 XR |

FOREIGN PATENTS

| | | |
|---|---|---|
| 1,218,921 | 6/1966 | Germany. |

WILLIAM J. STEPHENSON, *Primary Examiner.*